(12) United States Patent
Specht et al.

(10) Patent No.: US 6,612,326 B2
(45) Date of Patent: Sep. 2, 2003

(54) INFLATOR

(75) Inventors: Martin Specht, Feldafing (DE); Florian Sachsenhauser, München (DE); Thomas Heckmayer, Mindelheim (DE); Rudolf Meyer, Odelzhausen (DE); Joachim Verheugen, Funkstadt (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 122 days.

(21) Appl. No.: 09/972,598

(22) Filed: Oct. 8, 2001

(65) Prior Publication Data

US 2002/0074036 A1 Jun. 20, 2002

(30) Foreign Application Priority Data

Dec. 18, 2000 (DE) .......................... 100 63 093

(51) Int. Cl.[7] .......................... F16K 31/72; B60R 21/26
(52) U.S. Cl. ...................... 137/68.13; 137/69; 280/736; 280/737; 280/741; 280/742
(58) Field of Search ........................ 137/68.13, 68.19, 137/68.22, 69; 220/89.2, 89.3; 222/3, 5; 280/736, 737, 741, 742

(56) References Cited

U.S. PATENT DOCUMENTS

| 3,788,596 | A |   | 1/1974 | Maeda | 251/69 |
| 3,901,530 | A | * | 8/1975 | Radke | 280/736 |
| 4,203,616 | A |   | 5/1980 | Okada | 280/737 |
| 5,474,328 | A |   | 12/1995 | Nilsson | 280/737 |
| 5,860,443 | A |   | 1/1999 | Soemer et al. | 137/69 |
| 5,938,235 | A | * | 8/1999 | Butt | 280/737 |
| 5,947,143 | A |   | 9/1999 | Moakes et al. | 137/69 |
| 6,206,420 | B1 |  | 3/2001 | Skanborg et al. | 280/737 |
| 6,237,951 | B1 |  | 5/2001 | Bohman et al. | 280/737 |
| 6,247,725 | B1 |  | 6/2001 | Möller | 280/737 |

FOREIGN PATENT DOCUMENTS

| DE | 4141835 | 3/1994 |
| DE | 4311276 | 10/1994 |
| DE | 19540618 | 5/1997 |
| DE | 19618028 | 11/1997 |
| DE | 29714518 | 11/1997 |
| WO | 9218356 | 10/1992 |
| WO | 9716330 | 5/1997 |
| WO | 9912775 | 3/1999 |

OTHER PUBLICATIONS

Search Report on the corresponding International Application PCT/US01/29414, dated Jan. 23, 2002.*
Examination Report on the corresponding German Application 100 63 093.6–21, dated Aug. 28, 2001.*

* cited by examiner

Primary Examiner—Michael Powell Buiz
Assistant Examiner—Ramesh Krishnamurthy
(74) Attorney, Agent, or Firm—Lonnie Drayer

(57) ABSTRACT

An inflator for inflating an airbag has a vessel for containing compressed gas. The vessel has a gas outlet aperture. A support element is located in the gas outlet aperture with a sealing element next to the side of the support element that faces the interior of the vessel. A locking element is disposed in a locking position between a side of the support element that faces away from the interior of the vessel and a first abutment that is rigid with respect to the vessel. The support element is further supported by a second abutment that is rigid with respect to the vessel. A gas releasing device moves the locking element from the locking position to open the gas outlet aperture.

30 Claims, 5 Drawing Sheets

INFLATOR

FIELD OF THE INVENTION

The invention relates to an inflator that may be used for inflating an airbag.

DISCUSSION OF THE PRIOR ART

U.S. Pat. No. 6,247,725 teaches a device for inflating an airbag with compressed gas from a vessel. In this prior art device it is necessary that the device components have exact dimensions to avoid deviations in the force transmitted by a locking element for opening a gas pressure container intended to inflate an airbag. The device of the present invention overcomes this problem.

SUMMARY OF THE INVENTION

There is provided in accordance with the present invention a device for inflating an airbag in which a gas-tight seal of a vessel containing compressed gas is ensured when the components of the device for sealing and opening the vessel have production-dependent tolerances. Forces due to the internal pressure in the vessel are transmitted through a support element and are absorbed by two rigid abutments that are fixed with respect to the vessel. The support element is a support plate that is supported on the first abutment by a locking element at a point diametrically opposed to a second rigid abutment on which the support element rests. When the locking element is moved out of the locking position, a defined tilting movement of the support element about an edge of the second abutment opens the gas outlet aperture.

DETAILED DESCRIPTION OF THE INVENTION

Figure 1:
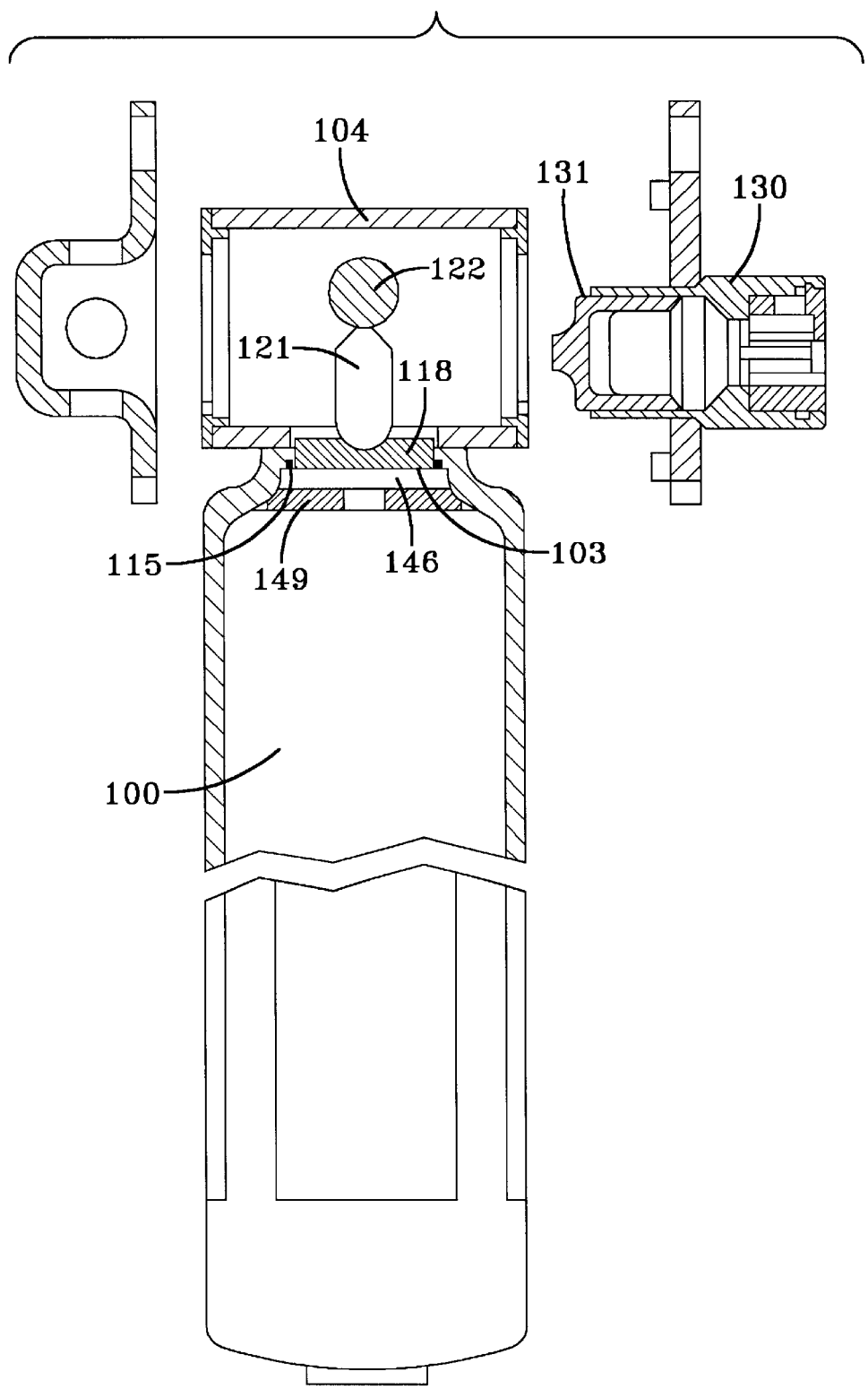
FIG. 1 is a longitudinal section of a prior art device.

It is known from the prior art, for example from U.S. Pat. No. 6,247,725, which is incorporated herein by reference, that a piston can be used to release gas from a storage vessel. FIG. 1 shows a prior art inflator taught in U.S. Pat. No. 6,247,725 that can be used for inflating an airbag with compressed gas from a vessel. A gas pressure container 100 includes an inflation head 104 that is contiguous to an outlet opening 103. The outlet opening is closed by a sealing element 115 that can be metal foil. The sealing element 115 is attached to a supporting disc 118 that is located in the outlet opening 103. The supporting disc 118 is in turn supported by a centrally arranged locking element 121 at an abutment 122 against the opening forces exerted upon said sealing element 115 by the gas pressure inside the container 100. An opening device is fitted with a triggering mechanism 130 which, when actuated, displaces locking element 121 and the sealing element 115, thereby opening the container outlet 103 and inflating an airbag. The locking element 121 can be moved out of the locking position by a laterally acting force that is produced by a piston 131 of the triggering mechanism 130, to open the gas outlet opening 103. It is suggested that to ensure that the pressure container will open and that an appropriate amount of gas will be released, a throttling member 149 be provided in the gas pressure container 100 in the direction of gas exhaust upstream from the outlet opening 103, with a pressure chamber 146 between said throttling 149 and the outlet opening 103 in the bottleneck. In the known device, the load on the supporting disc 118 produced by the compressed gas is conveyed via the centrally located locking element 121 into the abutment 122 that is rigid with the vessel containing compressed gas. For this purpose, it is necessary that the device components have exact dimensions in order to avoid deviations from the force transmission in the longitudinal axis of the locking element.

Figure 2:
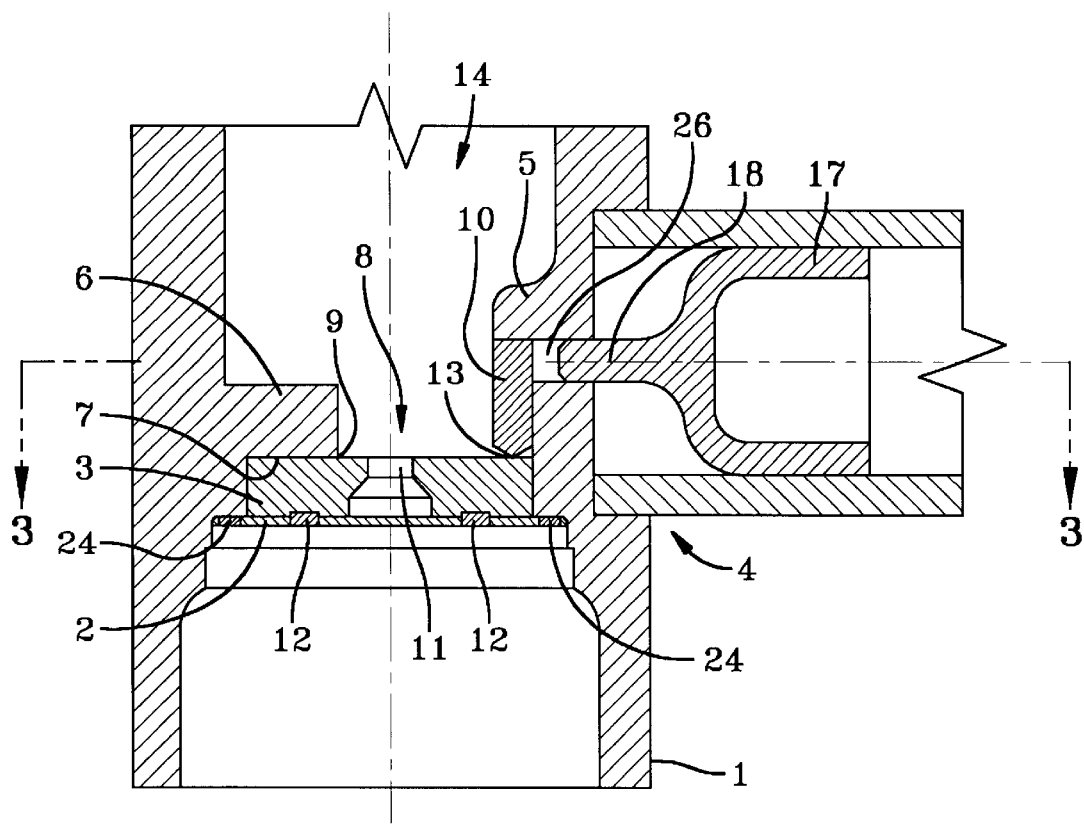
FIG. 2 is a longitudinal section of a first embodiment of the invention.
Figure 3:
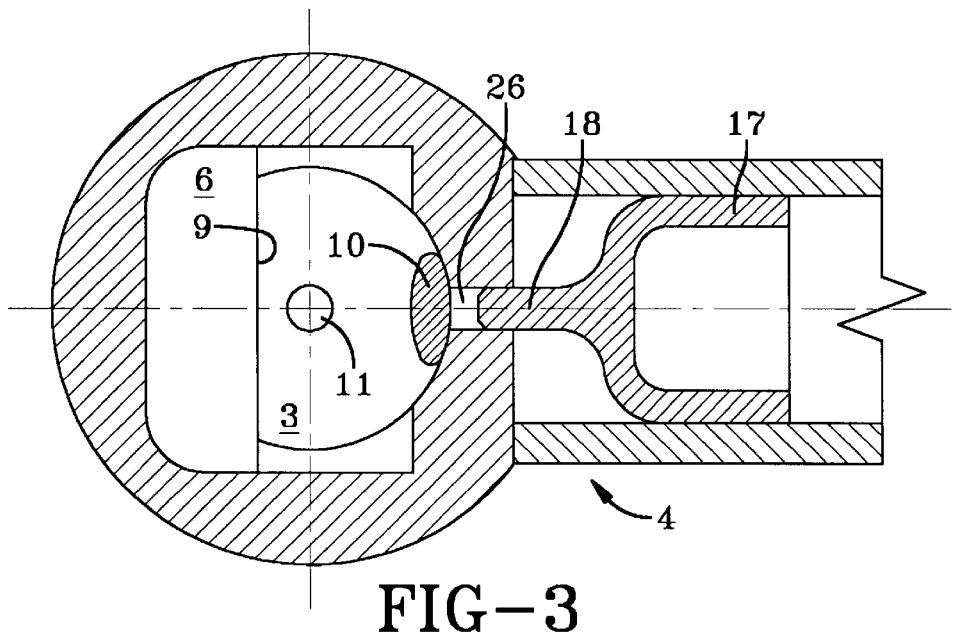
FIG. 3 is a cross-section of the embodiment shown in FIG. 2 taken at line 3—3 in FIG. 2.

FIGS. 2–7 show devices according to the present invention for inflating an airbag, and each of these devices employs a vessel 1 containing compressed gas. In the embodiment of FIGS. 2 and 3 the vessel 1 containing compressed gas is a cylinder and in the embodiments of FIGS. 4 to 6 the vessel 1 containing compressed gas is annular. The compressed gas in the vessel 1 serves to inflate an airbag. The vessel containing compressed gas has a gas outlet aperture therethrough that is closed and opened by a device 14. FIGS. 2–7 show the normal state when the vessel 1 containing compressed gas is closed.

Figure 4:
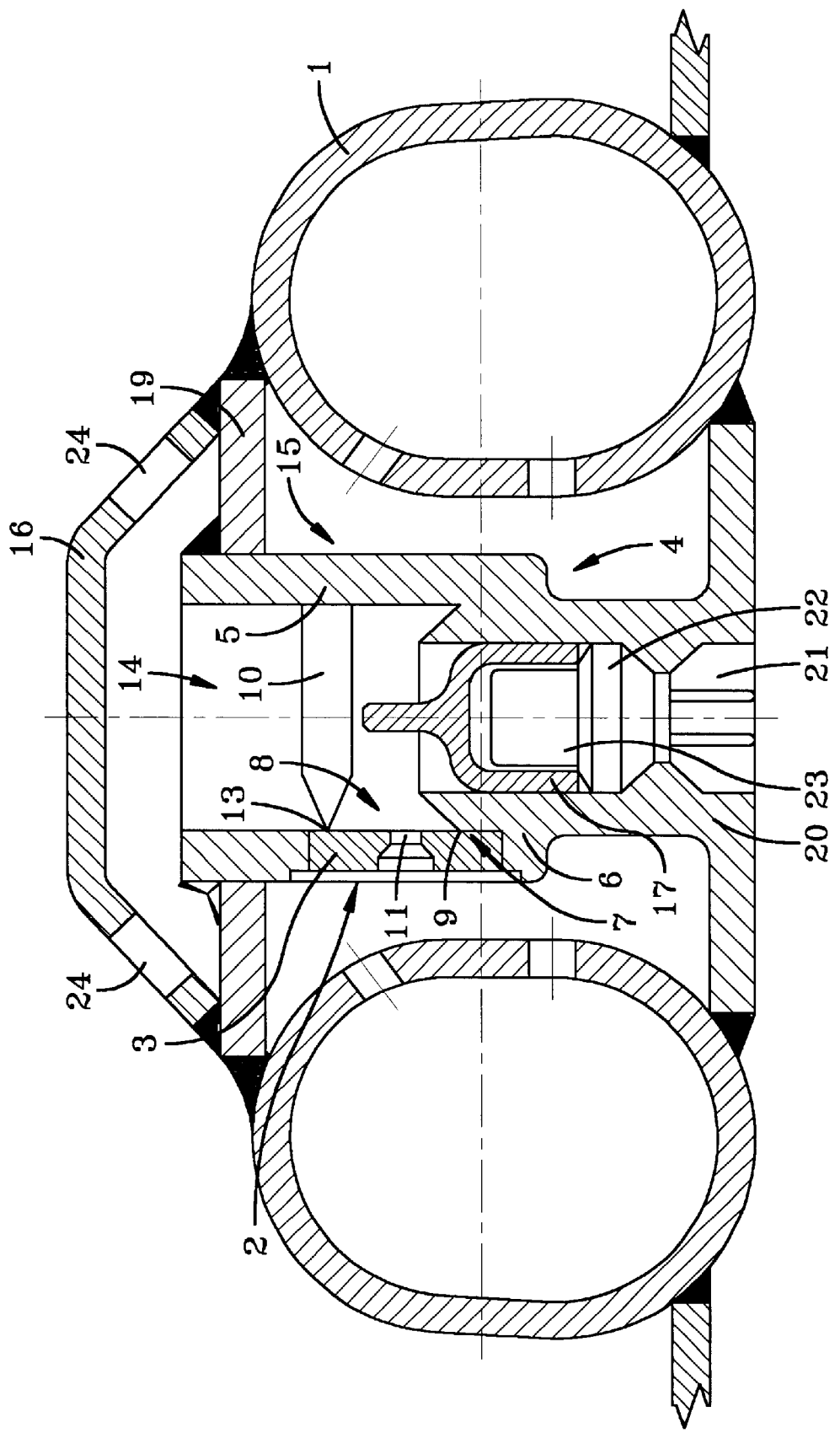
FIG. 4 is a cross-section of a second embodiment.

The device 14 for opening and closing the gas outlet aperture 8 has a support element 3 that is arranged in the gas outlet aperture. A sealing element 2, in particular a metal foil, made for example of V4A steel, is located on the side of the support element 3 that faces the interior of the vessel. This metal foil can have a thickness of for example 0.2 mm. The sealing element 2 is connected to the inside of the vessel to form a gas-tight seal by an annular connecting joint 24 that is formed by gluing or welding, in particular laser welding. A locating shoulder 29 located inside of the vessel 1 serves as a sealing face. This connecting joint is located on the outer peripheral edge of the preferably annular sealing element 2. The sealing element is also connected to the support element 3 in a gas sealing manner by an annular connecting joint 12. The annular connecting joint 12 can be produced by gluing or welding, in particular laser welding. The annular connecting joint 12 surrounds an aperture 11 through the support element 3 that can extend into the interior of the vessel as shown in FIGS. 2 and 4. During normal operation the aperture 11 is sealed by the sealing element 2. In the event of excess pressure in the vessel the sealing element 2 is destroyed in the region of the aperture 11, so that a pressure relief valve effect is achieved. The second connecting joint 12, which surrounds the aperture 11 in an annular manner, ensures that the portion of the sealing element 2 located inside the connecting ring and stretched over the aperture 11 is secure.

The support element 3 which is subjected to the gas pressure, for example 600 bar, of the inflation gas located in the vessel 1 is supported with respect to the vessel at two diametrically opposed locations. One support location is formed by a first abutment 5. A locking element 10 is located between this first abutment 5 and the support element 3. An abutment end 13 of the locking element 10 on contacts the support plate 3. The locking element 10 is supported at the other end by the first abutment 5. The first abutment 5 is rigidly connected to the vessel 1 containing compressed gas. A second abutment 6 is located diametrically opposed to the first abutment 5 and is also rigidly connected to the vessel 1.

The gas-tight installation of the sealing element 2 and the support of the forces exerted by the gas pressure in the interior of the vessel 1 is ensured by the present invention. Standard production tolerances for the support element 3, or for the sealing element 2, or for the adjacent regions of the vessel 1 containing compressed gas do not have an adverse effect on the device of the present invention. The support element 3 can comprise a softer material than the locking element 10. During assembly, when inserting the locking element 10 between the first abutment 5 and the support element 3, for example with the aid of a plunger on the inside of the support element 3, the abutment end 13 of the locking element 10 can press into the material of the support element 3. As a result, the tolerances on the components that cause the gas-tight seal of the vessel 1 containing compressed gas can be compensated for in conjunction with the support of the gas-tight seal by the two abutments 5, 6. Normal manufacturing tolerances are compensated for as a result of this as well as installation of the support element 3 in the correct position in the gas outlet aperture of the vessel 1. In the assembly process, the side of the support element 3 that faces the interior of the vessel is aligned with the bearing surface on which the sealing element 2 rests at its peripheral edge on the locating shoulder 29 of the vessel 1. A planar bearing surface is therefore provided for the sealing element 2 on the inside of the support element 3 and the bearing surface on the interior of the vessel surrounding this. The side of the support element 3 that faces away from the interior of the vessel is located in this embodiment on a plane bearing surface 7 of the second abutment 6 and on the abutment end 13 of the locking element 10. As shown in FIG. 3, which is a cross-section of the embodiment shown in FIG. 2 taken at line 3—3 in FIG. 2, the abutment end 13 of the locking element 10 and the bearing surface 7 are located at diametrically opposing points with respect to the support element 3 which is preferably a circular support plate. During normal operation, a gas-tight seal of the vessel 1 is achieved hereby. The abutment end 3 of the locking element 10 can be conical, in particular pointed in design.

Each embodiment of the invention has at least one gas releasing device 4 for opening the gas outlet aperture 8. The gas releasing device includes a piston 17 driven by a propellant charge 23, which is best seen in FIG. 4. At the leading end the piston 17 is a ram 18 which acts laterally on the locking element 10. That is to say, the piston is propelled in a direction that is substantially perpendicular to the locking element 10 and the axis of the gas outlet aperture 8, and moves the locking element from the locking position shown in the drawings. The ram 18 can be dispensed with so that the necessary force for displacing the locking element is produced by the air compressed by the moving piston which flows through the aperture 26 towards the locking element. However, the piston 17 can also be dispensed with, so that the force of the gas produced by the ignited propellant that flows through the aperture 26 moves the locking element 10 from the locking position shown in the drawings.

Figure 7:
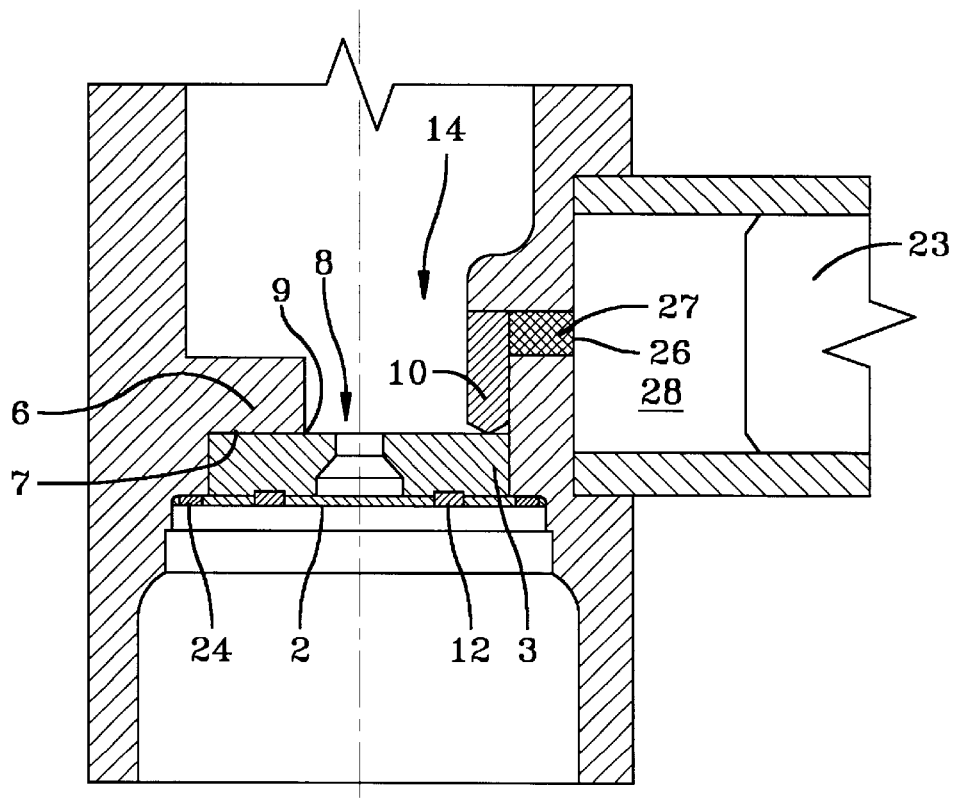
FIG. 7 is a cross-section of a fifth embodiment.

Alternatively, as shown in FIG. 7, a stopper 27 can be inserted in an aperture 26 with a selected release force. As a result of the propellant gas produced by the ignited propellant charge 23 pressure is built up in a chamber 28, as a result of which the release force of the stopper 27 is overcome and a force is exerted on the locking element 10 to displace the locking element from the locking position shown in the drawings.

In each of the disclosed embodiments when the locking element is displaced from the locking position shown in the drawings the gas pressure in the interior of the vessel causes the support element 3 to pivot about a limiting edge 9 that is provided on the second abutment 6. The limiting edge 9 preferably extends in a straight line as shown in FIG. 3. The limiting edge forms a pivoting axis for the support element 3, so that the support element 3 is tilted about the limiting edge 9. When the support element is pivoted the sealing element 2 is ruptured and the gas outlet aperture 8 of the vessel is opened.

The sealing element 2 is designed such that it cannot by itself withstand the gas pressure in the interior of the vessel. Only when the support element 3 is in the supporting position shown in the drawings does the sealing element 2 perform its gas sealing function. When the support element 3 is moved out of its supporting position because the locking element 10 is moved out of the locking position, the gas outlet aperture 8 is opened owing to the rupturing of the sealing element 2.

Figure 5:
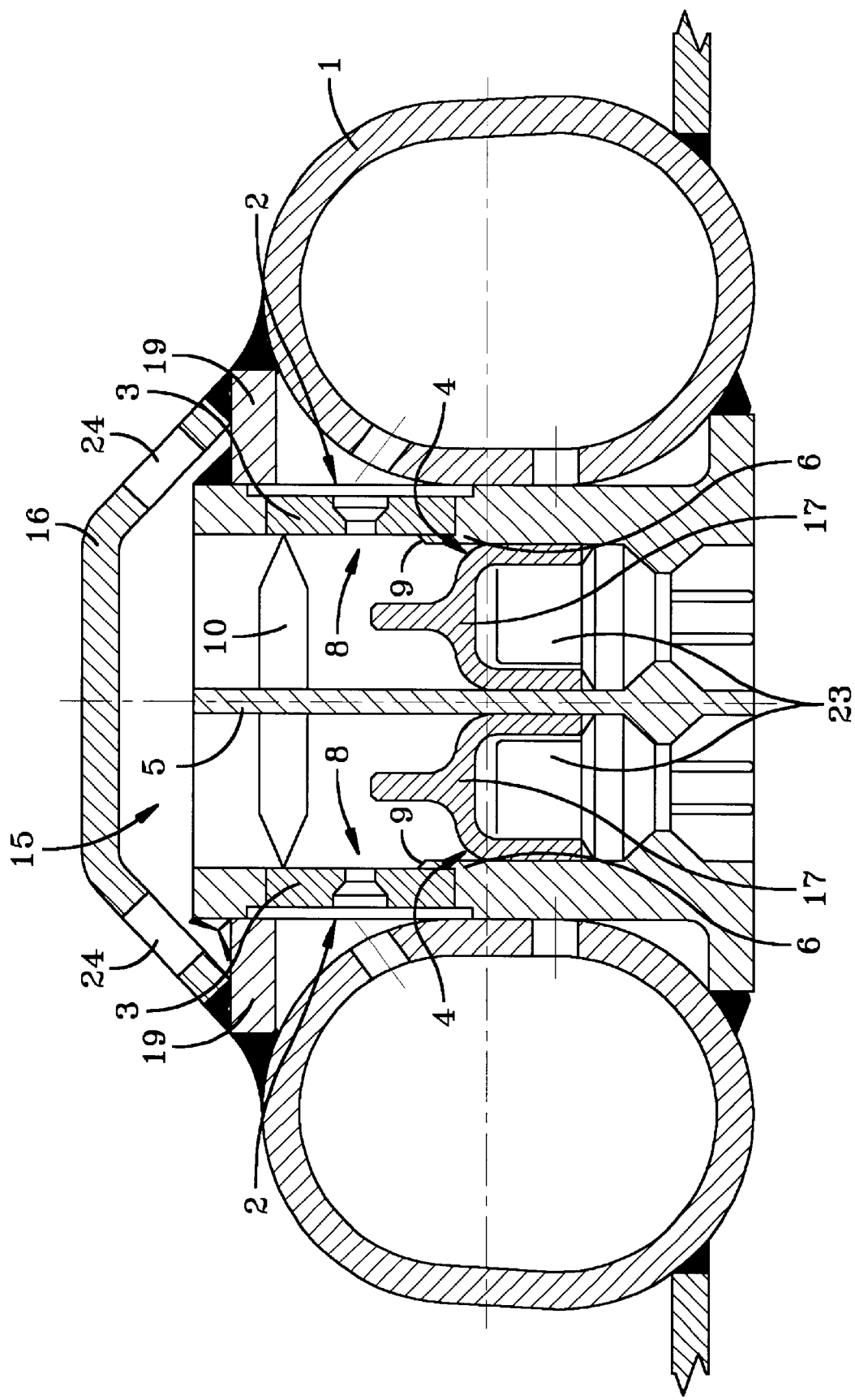
FIG. 5 is a cross-section of a third embodiment.
Figure 6:
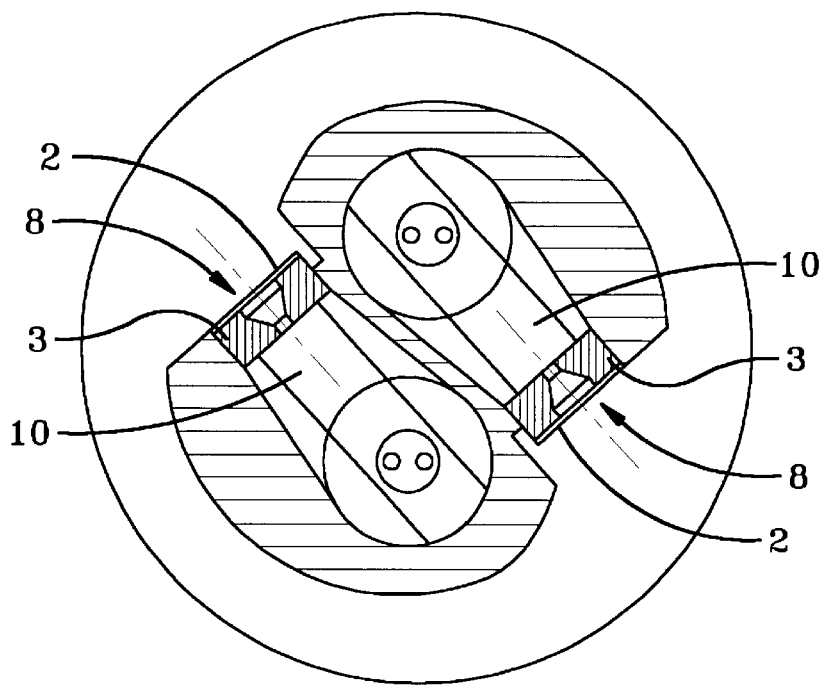
FIG. 6 is a cross-section of a fourth embodiment.

In the embodiments shown in FIGS. 2, 3 and 7 the device 14 for sealing and opening the cylindrical-shaped vessel 1 containing compressed gas is located at the upper end of the cylinder. In the embodiments shown in FIGS. 4 to 6, the device 14 for sealing and opening the vessel containing compressed gas and the gas releasing device 4 is preferably located in the center of the ring of the substantially annular vessel 1 containing compressed gas. In the embodiments of FIGS. 5 and 6, two devices 14 for sealing and opening the annular compressed gas vessel 1 are provided.

With reference to FIG. 4, a gas-tight seal 20 seals one side of the ring. A socket 21 for electrical connection of an igniter 22 is incorporated into this seal 20. The propellant charge 23 for the piston 17 can be ignited by the igniter 22.

A diffuser 16 is located on the other side of the ring. The diffuser 16 has apertures 24 through which gas exiting from the vessel 1 after the gas outlet aperture 8 has been opened flows into an airbag that is not shown in detail. The constructional unit 15 is installed on both annular sides of the annular vessel 1 so as to be gas-tight. As already mentioned, the gas-tight seal 20 is located on the one side of the ring and a ring seal 19, which encloses the outside of the constructional unit 15 in a gas-tight manner, is located inside the diffuser 16 on the other ring side. The external peripheral edge of the ring seal 19 is connected in a sealing manner to the vessel 1. The sealed connecting joints can be welded joints.

The wall region located in the interior of the ring of the vessel 1 containing compressed gas and shown in FIGS. 4 and 5 can be dispensed with as sealing of the interior of the vessel is achieved at the outside by the ring seal 19 and the gas-tight seal 20. An annular vessel containing compressed gas is then produced, on the inside of the ring of which the gas outlet aperture 8 is located. The axis of the gas outlet aperture 8 extends substantially perpendicular to the direction of movement of the piston 17 of the gas releasing device 4 which exerts a force on the locking element 10 to move it out of its locking position. There is an outlet aperture in the constructional unit 15, which is open towards the apertures 24 of the diffuser 16, in the axial direction to this unlocking movement of the piston 17.

In the embodiment shown in FIG. 5, two gas outlet apertures 8 are provided in the interior of the ring of the vessel 1. Two devices 14 for sealing and opening the vessel containing compressed gas are provided with the associated gas releasing devices 4 located in the region of these gas outlet apertures. The entire arrangement of these devices is preferably a constructional unit 15. While the gas outlet apertures 8 in the embodiment of FIG. 5 are located diametrically opposed to one another, in the embodiment of FIG. 6 they are provided on either side of the annular axis of the annular vessel containing compressed gas with apertures opening in different directions.

Many changes and modifications in the above-described embodiments of the invention can, of course, be carried out without departing from the scope thereof. Accordingly, the scope is intended to be limited only by the scope of the appended claims.

We claim:

1. An inflator comprising a vessel for containing compressed gas, the vessel having a gas outlet aperture, a support element is located in the gas outlet aperture with a sealing element next to the side of the support element that faces the interior of the vessel, a locking element is disposed in a locking position between a side of the support element that faces away from the interior of the vessel and a first abutment that is rigid with respect to the vessel, the support element is further supported by a second abutment that is rigid with respect to the vessel, and a gas releasing device that moves the locking element from said locking position to open the gas outlet aperture, the support element having an aperture therethrough that is covered by the sealing element and functions as a safety valve, the sealing element comprising a metal foil that is connected to the support element by a gas-tight connecting joint annularly surrounding the aperture through the support element.

2. The inflator according to claim 1 wherein the two abutments are diametrically opposed.

3. The inflator according to claim 1 wherein the second abutment has a bearing surface on which the side of the support element that faces away from the interior of the vessel rests.

4. The inflator according to claim 1 wherein the second abutment has a limiting edge limiting the gas outlet aperture.

5. The inflator according to claim 1 wherein the support element comprises a softer material than the locking element.

6. The inflator according to claim 5 wherein an abutment end of the locking element is pressed into the support element.

7. The inflator according to claim 1 wherein the locking element can be moved from the locking position by a force that is produced by the gas releasing device and acts laterally upon the locking element.

8. The inflator according to claim 7 wherein the force is transmitted by a ram that is attached to a piston.

9. The inflator according to claim 7 wherein the force is transmitted by a flow of gas.

10. The inflator according to claim 7 wherein the force is transmitted to the locking element by a stopper located in an aperture in the gas releasing device with a certain release force and is driven by a the gas generated when a propellant is ignited.

11. An inflator comprising a vessel for containing compressed gas, the vessel having a gas outlet aperture, a support element is located in the gas outlet aperture with a sealing element next to the side of the support element that faces the interior of the vessel, a locking element is disposed in a locking position between a side of the support element that faces away from the interior of the vessel and a first abutment that is rigid with respect to the vessel, the support element is further supported by a second abutment that is rigid with respect to the vessel, and a gas releasing device that moves the locking element from said locking position to open the gas outlet aperture, the support element comprising a softer material than the locking element, and an abutment end of the locking element is pressed into the support element.

12. The inflator according to claim 11 wherein the two abutments are diametrically opposed.

13. The inflator according to claim 11 wherein the second abutment has a bearing surface on which the side of the support element that faces away from the interior of the vessel rests.

14. The inflator according to claim 11 wherein the second abutment has a limiting edge limiting the gas outlet aperture.

15. The inflator according to claim 11 wherein the locking element can be moved from the locking posit on by a force that is produced by the gas releasing device and acts laterally upon the locking element.

16. The inflator according to claim 15 wherein the force is transmitted by a ram that is attached to a piston.

17. The inflator according to claim 15 wherein the force is transmitted by a flow of gas.

18. The inflator according to claim 15 wherein the force is transmitted to the locking element by a stopper located in an aperture in the gas releasing device with a certain release force and is driven by a the gas generated when a propellant is ignited.

19. An inflator comprising a vessel for containing compressed gas, the vessel having a gas outlet aperture, a support element is located in the gas outlet aperture with a sealing element next to the side of the support element that faces the interior of the vessel, a locking element is disposed in a locking position between a side of the support element that faces away from the interior of the vessel and a first abutment that is rigid with respect to the vessel, the support element is further supported by a second abutment that is rigid with respect to the vessel, and a gas releasing device that moves the locking element from said locking position to open the gas outlet aperture, and the vessel containing a compressed gas is substantially annular and the gas releasing device and the device for sealing and opening the vessel are arranged as a constructional unit in the annular interior of the vessel.

20. The inflator according to claim 19 wherein the two abutments are diametrically opposed.

21. The inflator according to claim 19 wherein the second abutment has a bearing surface on which the side of the support element that faces away from the interior of the vessel rests.

22. The inflator according to claim 19 wherein the second abutment has a limiting edge limiting the gas outlet aperture.

23. The inflator according to claim 19 wherein the support element has an aperture therethrough that is covered by the sealing element and functions as a safety valve.

24. The inflator according to claim 23 wherein the sealing element comprises a metal foil that is connected to the support element by a gas-tight connecting joint annularly surrounding the aperture through the support element.

25. The inflator according to claim 19 wherein the support element comprises a softer material than the locking element.

26. The inflator according to claim 25 wherein an abutment end of the locking element is pressed into the support element.

27. The inflator according to claim 19 wherein the locking element can be moved from the locking position by a force that is produced by the gas releasing device and acts laterally upon the locking element.

28. The inflator according to claim 27 wherein the force is transmitted by a ram that is attached to a piston.

29. The inflator according to claim 27 wherein the force is transmitted by a flow of gas.

30. The inflator according to claim 27, wherein the force is transmitted to the locking element by a stopper located in an aperture in the gas releasing device with a certain release force and is driven by a the gas generated when a propellant is ignited.

* * * * *